UNITED STATES PATENT OFFICE.

LOUIS MAICHE, OF PARIS, FRANCE.

PROCESS OF PURIFYING SPIRIT.

SPECIFICATION forming part of Letters Patent No. 604,996, dated May 31, 1898.

Application filed April 26, 1897. Serial No. 634,006. (No specimens.)

*To all whom it may concern:*

Be it known that I, LOUIS MAICHE, a citizen of France, residing at 368 Rue St. Honoré, Paris, France, have invented a certain new and useful Improved Process for the Purification of Spirits, of which the following is a specification.

This invention has for its object the removal from spirit of the fusel-oil and other substances which give objectionable flavor and odor to the spirit. For this purpose the spirit to be purified is largely diluted with water (it may be up to five times its volume) and subjected to distillation at a low temperature, such as 25° centigrade, under a vacuum as complete as can conveniently be obtained. Under these conditions most of the impurities are distilled off, leaving the dilute spirit comparatively pure. By further distillation in the usual way the spirit thus purified can be restored to any desired strength. As by the first distillation some spirit passes off with the impurities, the condensed liquid thus obtained (it may be from several of the primary distillations) is again diluted with water and subjected to the distillation at low temperature and pressure, by which the impure ingredients are driven off, leaving pure dilute spirit. The operation may be repeated several times till almost all the spirit is recovered, leaving the impure ingredients by themselves.

Having thus described the nature of this invention and the best means I know of carrying the same into practical effect, I claim—

The process herein described of purifying spirit, consisting in diluting crude spirit with several times its volume of water, distilling at a low temperature *in vacuo*, thereby eliminating impurities, and finally concentrating the dilute spirit by distillation in the usual manner.

In testimony whereof I have signed my name to this specification, in the presence of two subscribing witnesses, this 8th day of April, A. D. 1897.

LOUIS MAICHE.

Witnesses:
 CHAS. S. HOPKINS,
 G. F. WARREN.